3,166,599
PROCESS OF PREPARING BISYMMETRICAL
PHENOLIC COMPOUNDS
Robert Steckler, Chagrin Falls, Ohio, assignor to General
Aniline & Film Corporation, New York, N.Y., a corporation of Delaware
No Drawing. Filed May 13, 1960, Ser. No. 28,824
2 Claims. (Cl. 260—611)

The present invention relates to an improved process of preparing bisymmetrical phenolic compounds which are useful as intermediates in the preparation of a diversified number of chemical products.

Bisymmetrical phenolic compounds as a new and useful class of chemical intermediates is disclosed and claimed in application Serial No. 764,231, filed September 30, 1958, and now Patent No. 3,061,650, in the names of Robert Steckler, Jesse Werner and Frederick A. Hessel. The procedure utilized in preparing the said intermediates involves the condensation of 2 moles of a monohydric or polyhydric phenol with 1 mole of a polyalkoxy acetal, under conventional reaction conditions, in the presence of strong acids such as sulfuric acid, phosphoric acid, chloracetic acid, dischloracetic acid, trichloracetic acid, trifluoracetic acid, fluoboric acid, hydrochloric acid, alkane sulfonic acids, aryl sulfonic acids, etc. This process requires the presence of a substantial quantity of acid which functions as the condensing agent. The acid must be subsequently removed in order to isolate the bisphenol compound. Frequently, the resulting bis-phenol is soluble in these acids. In order to isolate the bis-phenol, especially from an acid of low volatility, such as sulfuric or phosphoric acid, it is necessary to neutralize the acid, thereby precipitating the bis-phenol. This prevents economical recovery of the acid, and adds additional cost of the neutralizing base. In addition, large quantities of water are frequently required in order to wash the reaction product free from acid or salts. In order to purify resinous condensation products, it is often necessary to add an organic solvent to the reaction mixture to reduce the resin viscosity in order to permit washing. The solvent must then be distilled off and recovered in order to yield the bis-phenol compound. All these steps are very time consuming and undesirable from an economic point of view.

I have found that the difficulties encountered in the foregoing process are readily overcome by catalytically condensing 2 moles of a monohydric or polyhydric phenol with 1 mole of a polyalkoxy acetal in the presence of a wet or substantially anhydrous cation exchange resin of the sulfonic acid type. By this procedure, the alcohol formed during the condensation reaction is liberated from the acetal groupings and removed from the reaction mixture so that the condensation proceeds to yield substantially high yields of the bisymmetrical phenolic compound. In the event the liberated alcohol is not removed or allowed to escape during the condensation reaction, an equilibrium is reached wherein the reaction will not progress further, and as a consequence, gives poor yields of the desired bisymmetrical phenolic compound. However, by allowing the liberated alcohol to be removed by distillation during the condensation reaction, the reaction between the phenol and acetal continues until substantially quantitative yields are obtained.

In practicing the improved process, it is highly desirable that the polymethoxy acetal be gradually added to the phenolic compound at a temperature of 160° to 180° in the presence of the cation exchange resin of the sulfonic acid type and allowing the liberated alcohol to distill into any conventional means such as the customary trap. This improved procedure is adaptable even to a continuous process whereby the mixture of the phenolic compound and polymethoxy acetal is fed continuously from the top to the bottom of a heated tower filled with the cation exchange resin of the sulfonic acid type, while permitting the liberated alcohol to escape through a suitable column. The reaction product, collected from the bottom of the column, consists of the bisymmetrical phenolic compound and excess phenol. The latter is readily separated by distilling off under vacuum, as it is more volatile than the desired bisphenol product and recycling it to the initial reaction mixture. Inasmuch as neither of the reacting components is lost in this catalytic condensation process, it is as a consequence far more economical than the present conventional process, regardless of whether a continuous or batch-type procedure is employed.

The bisymmetrical phenolic compounds prepared in accordance with the improved process of this invention are characterized by the following general formula:

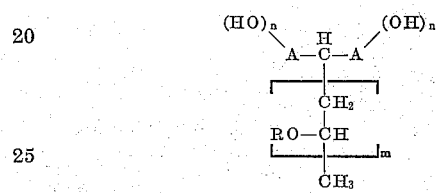

wherein A represents an aryl group, e.g. phenyl, diphenyl, naphthyl, or anthracyl; R represents an alkyl radical of 1 to 5 carbon atoms e.g. methyl, ethyl, propyl, isopropyl, butyl, amyl, etc.; A may be substituted by an alkyl group of 1 to 18 carbon atoms e.g. methyl, ethyl, propyl, butyl, amyl, hexyl, octyl, nonyl, dioctyl, dinonyl, decy, dodecyl, stearyl, etc., halogen, e.g. chlorine or bromine, amino, nitro, nitrile, carbonyl, chloromethyl, etc., $n$ represents 1 to 3 and $m$ represents 2 to 30, $n$ being 1 to 2 when A is either diphenyl or naphthyl and 1 when A is anthracyl.

The nature or character of the substituted or unsubstituted monohydric phenol or polyhydric phenol compound, which is condensed with the polyalkoxy acetal is immaterial so long as it contains at least one and not more than 3 hydroxy groups. The nature or character of substituents other than hydroxy is likewise immaterial, and the aryl nucleus of such monohydric phenol or polyhydric phenol compound may contain one or more substituents such as alkyl of 1 to 18 carbon atoms, halogen, i.e. chlorine or bromine, amino group, amide, carboxyl, chloromethyl, nitro, nitrile, alkylamide, etc., the only absolute prerequisite being the mono- or polyhydric phenol compound contain a reactive hydrogen atom attached to the aryl nucleus.

As illustrative of such monohydric and polyhdric phenol compounds, the following may be mentioned: phenol, o-, m-, and p-cresol, chlorophenols, nitrophenols, aminophenols, ethyl phenol, isopropyl phenol, butyl phenyl, tertiary butyl phenol, hexyl phenol, octyl phenol, decyl phenol, dodecyl phenol, tri-decyl phenol, diisobutyl phenol, nonyl phenol, dinonyl phenol, 3-penta-decyl phenol, stearyl phenol, 2,4- and 3,5-xylenol, cardanol, α- and β-naphthols, 2- and 9-hydroxy anthracene, orcinol, catechol, pyrocatechol, resorcinol, methyl resorcinol, 2-amino-resorcinol, hydroquinone, 2-hydroxy-hydroquinone, pyrogallol, phloroglucinol, methyl phloroglucinol, 4,4'-dihydroxy diphenol, 1,5-dihydroxy naphthalene and the like. It is to be noted that cardanol is a technical grade of anacardol having the formula:

wherein the $C_{15}$ side chain contains two double bonds and is linear.

The polyalkoxy acetals which are condensed with anyone of the foregoing monohydric and polyhydric phenol compounds or mixtures thereof are characterized by the following general formula:

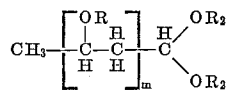

wherein $m$ and $R$ have the same values as above and wherein $R_2$ represents an alkyl group of from 1 to 5 carbon atoms, e.g. methyl, ethyl, propyl, isopropyl, butyl, isobutyl, amyl, etc.

Illustrations of such polyalkoxy acetals, the following may be mentioned:

1,1,3,5-tetramethoxy hexane
1,1,3,5-tetraethoxy hexane
1,1-diethoxy-3,5-dimethoxy hexane
1,1,3,5,7-pentamethoxy octane
1,1,3,5,7,9-hexamethoxy decane
1,1,3,5,7,9,11-heptamethoxy dodecane
1,1,3,5,7,9,11,13-octamethoxy tetradecane
1,1,3-trimethoxy-5-ethoxy hexane
1,1-dimethoxy-3,5-ethoxy hexane
1,1-dimethoxy-3,5,7-ethoxy octane
Polyalkoxy acetal obtained by condensing 1 mole of methanol with 30 moles of vinyl methyl ether It is to be noted that the higher polyalkoxy acetals may be obtained by employing 1 mole of either ethanol, propanol, butanol, monoethers of glycols, or any aromatic alcohol instead of methanol.

It is to be further noted that a mixture of two or more of the foregoing specific polyalkoxy acetals may be condensed with a mono- or polyhydric phenol. The proportions of the different polyalkoxy acetals in such a mixture is immaterial, as only 1 molecular equivalent thereof will condense with 2 molecular equivalents of the mono- or polyhydric phenol. The resulting bis-phenol compounds are included with the scope of the appended claims.

The foregoing polyalkoxy acetals and numerous species thereof are prepared in accordance with the methods disclosed in U.S. Patents 2,165,962 and 2,487,525. The methods of their preparation and the various species disclosed therein, which conform to the foregoing general formula, are incorporated herein by reference thereto.

As a representative class of cationic exchange resins of the sulfonic acid type, either, wet, i.e. containing from 25–50% water, or substantially anhydrous, that are employed as the catalyst in the condensation reaction of the present invention, the following are illustrative:

Phenol-formaldehyde sulfonic acid resins sold under the brand name of Amberlite IR–120, Dowex–30, Ionac C–200.

Sulfonic acid type cationic exchange resins sold under the brand name of Dowex–50 (sulfonated polystyrene).

Dowex 50–X8, 20–50 mesh (The Dow Chemical Company). A sulfonated acid from a copolymer of 92% styrene and 8% divinyl benzene, containing 50–56% water.

Sulfonated cation exchange resins sold under the brand name of Catex 27 and Zeokarb.

Additional examples of suitable resins of the sulfonic acid type may be found in Nachod's "Ion-Exchange" on pages 261–273, 1949 edition, published by the Academic Press of New York city, New York, U.S.P. 2,366,007; U.S.P. 2,500,149; U.S.P. 2,670,334–5; British Patents 670,145 and 654,706, and by the procedure described by S. M. Partridge et al. "Biochemical Journal" 46, No. 3, page 344, 1950, and by the procedure of K. W. Pepper, "Journal of Applied Chemistry" 1, page 124, 1951.

The cation exchange resins of the sulfonic acid type obtained by sulfonation of a cross-linked polymer of an aromatic vinyl monomer are readily and efficiently utilized as catalysts for the purpose of the present invention. Accordingly, sulfonated polymers from vinyl benzene (styrene), vinyl toluene, vinyl naphthalene, vinyl ethyl benzene, alpha-methyl styrene, vinyl chlorobenzene, and vinyl xylene, with a polyfunctional vinyl monomer, such as divinyl benzene, divinyl toluene, divinyl naphthalene, divinyl xylene, divinyl ethyl benzene, divinyl chlorobenzene, and divinyl-phenyl vinyl ethers are very useful. Resins of this type have been described in U.S.P. 2,366,007. As regards the latter for the purpose of the present invention, I prefer a copolymer containing 1–16% divinyl benzene with 99–86% styrene or vinyl toluene, obtained in fine bead form by suspension polymerization, and subsequently sulfonated.

I have also found that a resin comparable to Dowex 50–X8 can be prepared by first copolymerizing 84.9 parts of styrene with 15.1 parts of commercial divinylbenzene containing 53 parts of divinylbenzene, and 47 parts of ethyl vinylbenzene and diethyl benzene, thereby forming a highly cross-linked copolymer containing 8% of divinylbenzene. This copolymer is then sulfonated to form the aromatic sulfonic acid, which is the active catalyst. This process is described in U.S. 2,500,149, Sulfonation of Copolymers of Monovinyl- and Polyvinyl-Aromatic Compounds, Raymond F. Boyer (to Dow Chemical Company), Mar. 14, 1950 (Chemical Abstracts, 1950, 4607c). Also see U.S.P. 2,733,231, Sulfonation of Insoluble Aromatic Materials, William C. Bauman and Robert M. Wheaton (to Dow Chemical Company), Jan. 31, 1956 (Chemical Abstracts, 1956, 6711c).

The amount of the cation exchange resin of the sulfonic acid type to be employed is not critical. Amounts as small as 3 parts by weight of the dry cation exchange resin based on the weight of the 2 moles of mono-hydric or poly-hydric phenol give satisfactory yields of the bisymmetrical phenolic compound. When the cation exchange resin of the sulfonic acid type contains from 25 to 50% water, the amount to be employed as catalyst may range from 40 to 50 parts by weight, based on the weight of 2 moles of the aromatic phenol employed in the condensation reaction.

The following examples, which are merely illustrative, will show the improved process of preparing the bisymmetrical phenolic compounds. All parts given are by weight.

*Example I*

Into a 500 cc. 3-necked flask equipped with agitator, thermometer, Claisen adapter with thermometer in the vapor phase, Dean and Stark moisture trap and condenser there were charged 360 parts of phenol crystals and 50 parts of Dowex 50–X8. The batch was heated with agitation, while adding dropwise from a dropping funnel 1,1,3,5,7-pentamethoxy octane, and using the following schedule:

| Time | °C. Batch | °C. Vapor | Total cc. 1,1,3,5,7-Pentamethoxy Octane Added | Distillate, Mixture of Water and Alcohol Total cc. Collected in Trap |
|---|---|---|---|---|
| 25 Min | 120 | 98 | 5 | 0 |
| 30 Min | 127 | 100 | 10 | 9 |
| 40 Min | 160 | 100 | 20 | 30 |
| 50 Min | 166 | 95 | 22 | 37 |
| 55 Min | 163 | 102 | 50 | 42 |
| 1 Hr. 15 Min | 170 | 80 | 100 | 65 |
| 1½ Hrs | 160 | 85 | 184 | 92 |
| 3 Hrs. 15 Min | 170 | 82 | 184 | 117 |
| 4 Hrs. 15 Min | 169 | 83 | 184 | 118 |

The temperature was allowed to drop to 80° C. and the batch filtered through paper. The filtrate was a clear dark liquid. A sample taken was soluble in 5% NaOH, and after addition of ammonium carbonate, a solid resin precipitated, which after reprecipitation, washing with water and drying was identified as the bisphenol having the following formula:

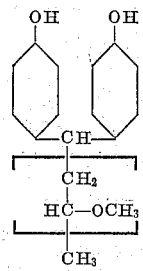

A molecular weight determination showed the following results: Calculated: 388. Found: 395. Another sample was used to determine solids, which were found to be 50%, after heating for ½ hour at 170° C. The residue was a hard and brittle resin at room temperature, and was soluble in acetone, methyl ethyl ketone and caustic soda, but insoluble in sodium carbonate. By distillation in vacuo, the phenol was stripped from the clear reaction product, leaving the bis-phenol.

The catalyst, filtered from the batch, can be reused without purification in subsequent reactions. It differed from fresh catalyst only in water content, as most of the water contained in the original catalyst had been distilled off. Accordingly, a substantially anhydrous catalyst may be employed in which case the distillate will contain alcohol instead of a mixture of water and alcohol.

The distillate which was collected in the moisture consisted of a solution of 22.5 grams water (from the catalyst) 41 grams (52 cc.) methanol (from the condensation reaction, 44.6 grams theoretical and 43.5 cc. of a higher boiling fraction consisting of phenol and pentamethoxy octane, which were carried over by the water and methanol vapors. The calculated yield, based on 1,1,3,5,7-pentamethoxy octane consumed, and non-volatile content of reaction product, was over 95%.

Example II

Into the apparatus of Example I there were charged 24 parts of resorcinol and 8 parts of Amberlite IR-120 (a sulfonic acid from a styrene-divinyl benzene copolymer, 16–50 mesh, containing 35–45% water). The batch was heated with agitation while adding 60 parts of 1,1,3,5,7-pentaethoxy octane dropwise over a 25–60 minute period while maintaining the temperature at approximately 170° C. and while allowing the volatiles to collect in a moisture trap as in Example I. After a period of 5 hours the reaction temperature was allowed to drop to 80° C. and the batch filtered through paper. The filtrate was a clear dark liquid. A sample of the dark liquid is soluble in 5% caustic soda. Addition of aqueous ammonium carbonate to the caustic soda solution precipitated a solid resin which after purification and identification has the following formula:

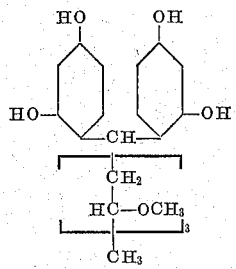

The foregoing product is soluble in acetone and the molecular weight determination thereof in acetone was as follows: Calculated: 420. Found: 415.

Example III

Example I was repeated with the exception that the phenol was replaced by 12 parts of cashew nutshell oil (Cardanol) and the Dowex 50–X8 was replaced by 5 parts of Zeokarb. The batch was heated with agitation while adding 15 parts of 1,1,3,5,7-pentamethoxy octane dropwise during a period of 1 to 1½ hours at a temperature of 170° C. and while allowing the volatiles to collect in a moisture trap as in Example I. The temperature was allowed to drop to 80° C. and the batch filtered through paper and treated in precisely the same manner as in Example I. The resulting product was purified by dissolving it in 10% aqueous caustic soda followed by precipitation with ammonium carbonate. The molecular weight of the purified product was as follows: Calculated: 800. Found: 804. The product is characterized by the following formula:

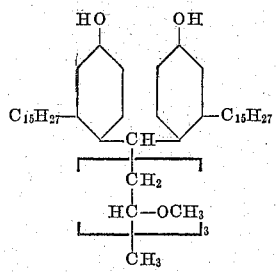

Example IV

Example I was again repeated with the exception that the phenol was replaced by 24 parts of chloroglucinol, and the Dowex–50–X8 was replaced by 10 parts of dry Dowex–30. The batch was heated with agitation while adding 30 parts slowly and dropwise during 20 minutes of 1,1,3,5,7-penthamethoxy octane while maintaining the temperature at approximately 170° C. for a period of 1 to 1½ hours and while allowing the alcohol to collect in the moisture trap as in Example I. The temperature was allowed to drop to 80° C. and the batch filtered through paper and treated precisely in the same manner as in Example I. The resulting product was purified by dissolving it in 10% aqueous caustic soda followed by precipitation with ammonium carbonate. The molecular weight of the purified product was as follows: Calculated: 452. Found: 460. The product is characterized by the following formula:

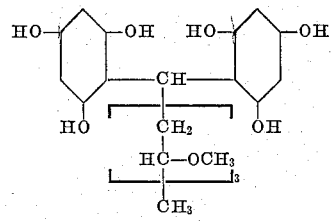

Example V

Example I was again repeated with the exception that the phenol was replaced by 12 parts of m-cresol and the Dowex–50–X8 was replaced by 5 parts of anhydrous Ionac C–200. The batch was heated with agitation while adding 15 parts of 1,1,3,5,7-pentamethoxy octane slowly and dropwise during a period of 1–1½ hours at a temperature of 65° and while permitting the alcohol to collect in a moisture trap as in Example I. The temperature was allowed to drop to approximately 78° C. and the batch filtered through paper and treated precisely in the same manner as in Example I. The resulting product was purified by dissolving it in 10% aqueous caustic soda, followed by precipitation with ammonium carbonate. The molecular weight of the purified product was as follows: Calculated: 630. Found: 622. The product is characterized by the following formula:

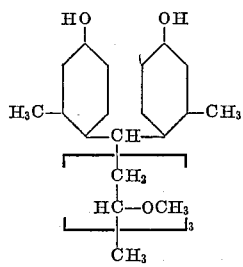

I claim:
1. The process of preparing bisymmetrical phenolic compounds which comprises condensing 2 moles of phenol with 1 mole of a polyalkoxy acetal having the following general formula:

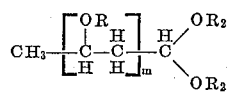

wherein R and $R_2$ represent an alkyl radical of 1 to 5 carbon atoms, and $m$ represents a positive integer of from 2 to 30, at a temperature of 160–180° C. in the presence of a catalytic amount of a sulfonic acid cation exchange resin and removing the resulting alcohol as formed.

2. The process according to claim 1 wherein the polyalkoxy acetal is 1,1,3,5,7-pentamethoxy octane.

References Cited in the file of this patent

FOREIGN PATENTS

| | | |
|---|---|---|
| 1,207,818 | France | Sept. 7, 1959 |
| 337,382 | Great Britain | Nov. 10, 1930 |

OTHER REFERENCES

Sussman: Ind. and Eng. Chem., vol. 38 (1946), pages 1228–1230, TP1A58.

Hamilton et al.: Industrial and Engineering Chemistry, vol. 49, No. 5, May 1957, pages 838–846, pages 838 and 846 relied on.

Othmer et al.: Industrial and Engineering Chemistry, vol. 50, No. 9, September 1958, pages 1235–1244, pages 1235, 1236, 1242, 1243 and 1244 relied on.